May 4, 1965 A. B. LOWERY 3,181,620
PORTABLE CULTIVATING IMPLEMENT
Filed Feb. 28, 1963
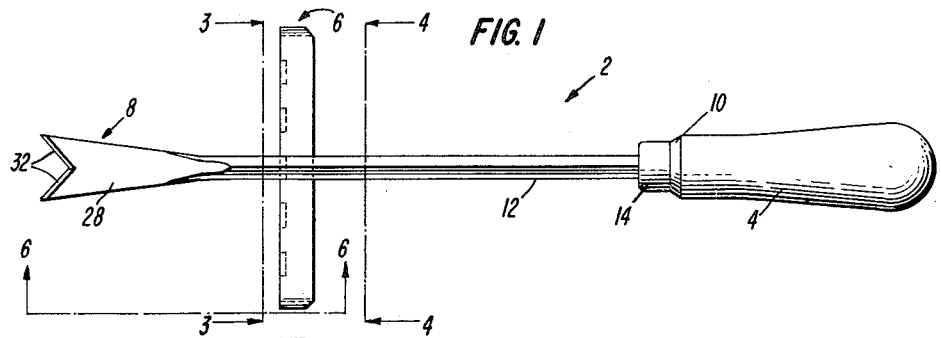
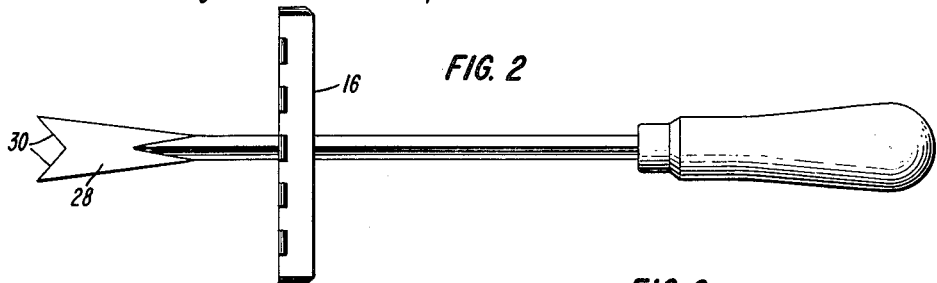
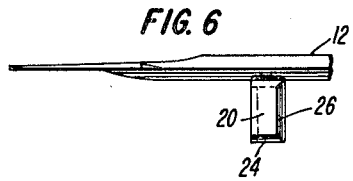
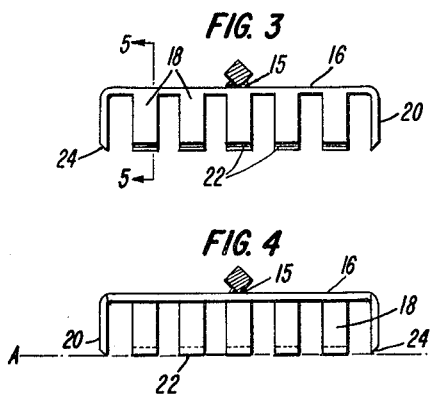
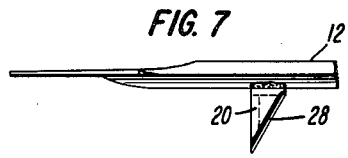
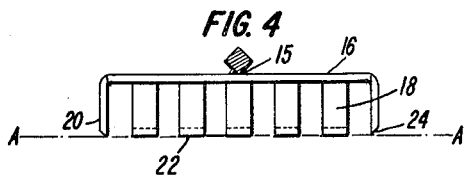
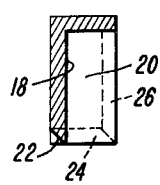
ALEXANDER B. LOWERY
INVENTOR.
BY Jacobi & Davidson
ATTORNEYS United States Patent Office 3,181,620
Patented May 4, 1965

3,181,620
PORTABLE CULTIVATING IMPLEMENT
Alexander B. Lowery, West Point, Va., assignor to Greenlife Products Company, West Point, Va., a corporation of Virginia
Filed Feb. 28, 1963, Ser. No. 261,704
8 Claims. (Cl. 172—375)

The present invention relates generally to cultivating implements, and specifically to a hand tool for removing undesired vegetation from selected areas whereby the area is prepared to receive a mulch or fertilizer. More specifically, this invention is directed to a portable cultivating implement particularly adapted for simultaneous tilling and raking of a given area, while severing and removing undesired vegetation therefrom, and otherwise preparing the turf about plants, shrubs, and the like.

There are presently available various types of implements for raking soil and, in some instances, implements are provided for independently severing and raking vegetation, in which cases provision is made for cutting and removing obnoxious growths such as weeds and the like. However, the implements as presently known do not provide for simultaneous severing and cultivating or tilling of the soil.

In detailed aspect, a primary object of the present invention is to provide a hand tool including a cultivating unit which is adapted to sever and remove vegetation from a selected area by simultaneous horizontal shearing actions and vertical transverse cutting actions, and which further is adapted to independently cut deep roots in a more or less conventional manner.

Another primary object of this invention is to provide a portable cultivating implement that is not only capable of severing obnoxious growths, but is capable of unusually efficiently simultaneously tilling and raking, and otherwise preparing soil as well, especially the soil about plants, shrubbery, and the like.

A further primary object of the present invention is to provide a portable cultivating implement including a cultivating means, said cultivating means comprising, in turn, a plurality of severing portions commonly supported and angularly positioned with respect to one another, whereby obnoxious growths, such as weeds and the like, as well as grass, growing or otherwise existing in a plurality of angularly disposed directions, will effectively be severed and be capable of unusual and efficient removal from said turf.

In addition to the general primary objects set forth above, the present invention has further, more specific primary objects, namely, (a) to provide a portable cultivating implement that is so constituted and arranged as to loosen the turf about plants, shrubs, and the like, and to sever various plant growths, such as weels, grass, and the like, in one unusually efficient simultaneous operation; (b) to provide a portable cultivating implement that is so constituted and arranged as to provide for effective simultaneous raking and tilling of the turf about shrubs, plants, and the like, whereby entire portions of obnoxious growths, such as crab grass, or other similar growth, will be removed, the same being accomplished in a manner wholly impossible with ordinary and conventional implements; (c) to provide a portable cultivating implement for raking and tilling, weeding, edging, trimming and pruning, and otherwise preparing the turf about plants, shrubs, and the like, for plant food; (d) to provide a portable cultivating implement comprising a plurality of commonly supported angularly disposed severing elements for efficiently severing and disentangling cuttings and debris and for rendering the same such as to provide effective removal thereof from the turf about plants, shrubs, and the like; and (e) to provide a portable cultivating implement that is so constituted and arranged as to provide for efficient severing, substantially below the surfaec of the soil about shrubs, plants, and the like, and subsequent removal of obnoxious growths, such as relatively large weeds that send out runners or branches from the main stem and take root in said soil, with a minimum of effort upon the part of the user.

The invention lies in the construction, arrangement, and combination of the various assemblies, parts, and components of the portable cultivating implement which form the preferred embodiments of the present invention and which are described in detail hereinbelow. The description refers to the illustrative embodiments of the invention presented in the annexed drawings, wherein:

FIG. 1 is a plan view of a portable cultivating implement in accordance with the present invention;

FIG. 2 is a bottom view of FIGURE 1;

FIG. 3 is a cross-sectional view taken along the line 3—3 of FIG. 1;

FIG. 4 is a cross-sectional view taken along the line 4—4 of FIG. 1;

FIG. 5 is a cross-sectional view, drawn to an enlarged scale, and taken along the line 5—5 of FIG. 3;

FIG. 6 is a detailed elevational view taken along the line 6—6 of FIG. 1, and

FIG. 7 is a view similar to that of FIG. 6 but showing a modification of the severing portions illustrated therein.

Referring now to the drawings, a portable cultivating implement in accordance with the present invention, generally designated by the numeral 2, is illustrated therein. The portable cultivating implement 2 comprises a handle 4, a cultivating element 6, and severing element 8, the elements 6 and 8 being structurally operatively associated with the handle through an elongated rod member or tang 12. The handle 4 and tang 12 cooperate to define a handle means having a central axis.

The handle 4 may be fabricated in any suitable manner and of any sutiable material, such as, for example, wood. The shape of the handle 4 is chosen so as to render the same convenient for gripping whereby the implement 2 may readily be handled for the purposes intended.

The cultivating element 6 and severing element 8 may be structurally operatively associated with the handle 4 in any suitable manner. For example, one end 10 of the handle 4 may be longitudinally bored (not shown) thereby snugly embracing, by driving fit, one end of the elongated rod member or tang 12, which is then longitudinally aligned with the handle. If desired, a cap 14 may be provided to insure the connection between the handle 4 and the tang 12.

The tang 12 may be fabricated in any suitable manner and of any suitable material, such as, for example, formed from a piece of bar stock. As illustrated in the drawings, the tang 12 is generally diamond-shaped in cross-section, though the same may, of course, be varied as desired.

The cultivating element 6, fabricated in any suitable manner and of any suitable material, such as the material from which the tang 12 is fabricated, comprises a supporting portion 16 in the form of a bar member structurally operatively associated with the tang 12 in any suitable manner, as by spot welding, indicated at 15. Integrally associated with the supporting portion 16, and extending downwardly therefrom, are a plurality of tines. One group of tines is formed by those numbered 18 and another group is formed by those numbered 20.

The tines 18 are positioned transversely of the longitudinal axis of the tang 12, and are beveled at their lower edges to form severing or cutting portions or surfaces 22. The surfaces 22, as shown, are aligned end to end or along a bottom axis A—A which extends perpendicular to the longitudinal axis of tang 12. The spacing between the tines 18 is generally equal to the transverse dimension thereof. However, if desired, the spacing can be varied preferably between limits where the same equals generally one-half of the transverse dimension of the tines, or the transverse dimension of the tines equals generally one-half of the spacing therebetween. It is to be understood, however, that the spacing between the tines 18 with respect to the transverse dimension thereof should never be so large as to permit various plant growths to be removed to escape the implement 2 thereby mitigating its effectiveness, and should never be so small as to prevent soil from passing efficiently therebetween.

The tines 20 are angularly positioned with respect to the tines 18, thereby being positioned in a plane generally parallel with respect to the longitudinal axis of the tang 12. The lower edges of the tines 20 of the preferred embodiment are also beveled thereby providing severing or cutting portions 24, which cutting portions lie in the same plane as the cutting portions 22 though angularly, preferably perpendicularly, disposed with respect thereto. However, as indicated below, the bottom edge can be a sharp point as in the embodiment of FIGURE 7. Additionally, the trailing edge of the tines 20 are beveled to form severing or cutting portions 26, said portions lying in a plane and being disposed angularly with respect to the cutting portions 22 and 24. As shown, the angular disposition of the edges 26 are such that the tines 20 are generally rectangularly shaped.

From the preceding discussion it should be appreciated that the cultivating unit or means 6 consists essentially of one elongated bar member 16, a first group of tines 18 and a second group of tines 20. The elongated bar member 16 is secured to the tang or elongated bar member 12 such that the longitudinal axis of the bar member 16 is disposed perpendicularly to the longitudinal axis of the rod member 12. The first and second group of tines are carried by, and preferably integrally formed with, the bar member.

Regardless of the embodiment the spacing between all of the tines along the bottom axes is greater than one-half the dimension parallel to the bottom axis of the tines in the first group and less than twice such dimension. Of course, this spacing applies to the distance between adjacent tines 18, as well as the distance between end tines 18 and the adjacent side tine 20.

In any embodiment the cutting surfaces are disposed in two mutually perpendicular planes, and in the preferred embodiment, the cutting surfaces extend in three mutually perpendicular planes.

The distance between the longitudinal axis of the tang 12 and the tines 20 is chosen so that roots will be transversely effectively severed and laterally extending linking vegetation will not impede effective operation. Specifically, the side tines 20 clearly define the lateral dimension of the working area, and any part of the vegetation in that area is severed from any vegetation or roots extending laterally therebeyond so that removal of vegetation within the work area is not dependent on entanglement with vegetation to the side of the work area.

The severing element 8 is provided as an auxiliary aid. It may be fabricated in any suitable manner and from any suitable material. As shown, the element 8 is fabricated integrally with the tang 12 and is of the same material. The element 8 comprises a relatively planar tongue 28 and a plurality of angularly disposed cutting tines 30. The tines 30 are beveled, as indicated at 32, to form cutting edges. There is provided, therefore, a V-form cutting edges. There is provided, therefore, a V-shaped or bifurcated severing or cutting element capable of severing the roots of various plant growths substantially below the surface of the soil and which may be not effectively handled by the tines 18 and 20. In this connection, it is to be understood that the distance between the severing element 6 and the severing element 8 is such as to enable the latter to be inserted into the soil a substantial distance whereby to sever a substantial or major portion of the root.

It is to be further understood that the extent of the angular disposition of the tines 30 with respect to one another depends upon the function such tines are to perform. Thus, if the tines 30 are to sever one portion of the root from another, then the angle therebetween can be relatively large. However, if the tines 30 are to perform the function of severing the root from the soil in toto, then the angular disposition between the tines 30 should be relatively small, whereby the tines will effectively grip the root substantially below the surface of the ground and enable one, upon the application of upward force, to sever the root from the soil. In this latter connection, the severing element 8 is inserted into the soil until it positively engages the root to be severed therefrom and the severing element 6 rests upon the surface thereof. The severing element 6 will act as a fulcrum and the handle 4 as a lever enabling one to apply upward force to the element 8 and remove the root with a minimum of effort. The implement 2 can be gripped so that the tines 18 extend upwardly from the supporting portion 16 when the element 6 rests upon the soil whereas not to unnecessarily disturb or harm the same.

Notwithstanding the inclusion of severing element 8 on the tool, of the preferred embodiment, the same can be eliminated, if desired. The severing element 8 is generally conventional, and insofar as the present invention is concerned, the element 8 is important only as an auxiliary means in combination with the basic tool including the cultivating unit 6.

Referring now to FIG. 7 of the drawing, a modification of the cultivating unit 6, or specifically tang 20 is illustrated therein. The cultivating unit 6 is, in all respects, with the exception of the tines 20, the same as that of FIG. 6. The difference is that the trailing edge of the tines 20 is beveled to form a cutting edge 28, which is angularly disposed with respect to the leading edge thereof so that the tines 20 are triangularly shaped. The bottom edges of tines 20 are, in this instance, sharp points. Still the cultivating element 6 has a plurality of cutting edges that are perpendicularly disposed with respect to one another, whereby the roots and branches of various plant growths extending in different directions will effectively be severed and capable of efficient gathering and removal from the soil, just as described above. Thus, roots and branches angularly disposed with respect to the cutting edges 22, the cutting edges 24 and the cutting edges 28 all will efficiently be severed.

The use of the implement 2 is believed readily apparent from the above description. When it is desired to cultivate the soil about plants, shrubs, and the like, the cultivating element 6 is placed into the soil and, with short strokes thereof towards the user, will sever through shearing and cutting operations various plant growths with substantial disregard to the direction in which they are disposed. Simultaneously therewith, the cultivating element 6 will perform efficiently the function of raking and otherwise gathering the cuttings and debris that have been severed. Should it be desired to deeply sever, either partially or in toto, the roots of various obnoxious growths, such as weeds and the like, the severing element 8 need merely be inserted into the soil until positively engaged with said root, in the manner as described hereinbefore.

After reading the foregoing detailed description of the preferred and illustrative cultivating implement incorporating the various embodiments of my invention, it will be understood that the objects set forth at the outset of this specification have been successfully achieved. Accordingly,

What is claimed is:

1. A hand cultivating implement comprising: An elongated handle means having a central axis, and a cultivating unit secured to said handle means; said cultivating unit including an elongated bar member having a longitudinal axis disposed perpendicularly to said handle means central axis; first and second groups of tines depending downwardly from said bar member during the normal use of said implement; said first group of tines including a plurality of spaced apart tines each having a sharpened cutting edge aligned along a bottom axis substantially parallel to the longitudinal axis of said bar member and hence substantially perpendicular to said handle means central axis; said second group of tines including at least two tines positioned respectively on opposite sides of said first group of tines; each tine in said second group of tines having a sharpened cutting edge lying in a plane perpendicularly disposed to a plane containing an axis parallel to said bar member longitudinal axis and containing said bottom axis along which said cutting edges of said first group of tines are aligned.

2. A hand cultivating implement as defined in claim 1 wherein all of said tines are integral with said bar member.

3. A hand cultivating implement as defined in claim 1 wherein said first group of tines are generally rectangular in shape.

4. A hand cultivating implement as defined in claim 3 wherein the transverse width of each of said tines in said first group is between one-half and two times as great as the space between adjacent tines in said first group.

5. A hand cultivating implement as defined in claim 1 wherein said second group of tines are triangular in shape and terminate in a pointed bottom which is substantially coplanar with said bottom axis.

6. A hand cultivating implement as defined in claim 1 wherein said second group of tines are generally rectangular in shape and wherein their sharpened cutting edge includes a bottom edge which is substantially coplanar with said bottom axis.

7. A hand cultivating implement as defined in claim 6, wherein said sharpened cutting edge for said second group of tines also includes a side edge extending between said bottom edge and said bar member.

8. A hand cultivating implement as defined in claim 1 but further characterized by a severing means attached to said handle means, said severing means terminating in a tongue portion having a V-shaped groove therein, the edges of said V-shaped groove being sharpened to provide cutting edge for said severing means.

References Cited by the Examiner

UNITED STATES PATENTS

| | | | |
|---|---|---|---|
| 951,547 | 3/10 | Randall | 172—13 |
| 1,194,995 | 8/16 | Green | 56—400.11 |
| 1,573,222 | 2/26 | Coelho | 172—375 X |
| 1,632,883 | 6/27 | Carkey | 172—375 |
| 2,010,325 | 8/35 | Sawyer | 172—375 X |
| 2,133,208 | 10/38 | Nellis | 172—13 |
| 2,497,506 | 2/50 | McCaskill | 172—375 |
| 2,513,033 | 6/50 | Linden | 172—375 |

T. GRAHAM CRAVER, *Primary Examiner.*